United States Patent
Palmer et al.

(10) Patent No.: US 10,796,504 B2
(45) Date of Patent: Oct. 6, 2020

(54) SYSTEMS AND METHOD TO TRIGGER VEHICLE EVENTS BASED ON CONTEXTUAL INFORMATION

(71) Applicant: SmartDrive Systems, Inc., San Diego, CA (US)

(72) Inventors: Jason Palmer, Carlsbad, CA (US); Mark Freitas, San Diego, CA (US); Daniel A. Deninger, Carlsbad, CA (US); David Forney, La Jolla, CA (US); Slaven Sljivar, San Diego, CA (US); Alekh Vaidya, San Diego, CA (US); Jeffrey Griswold, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 193 days.

(21) Appl. No.: 15/727,227

(22) Filed: Oct. 6, 2017

(65) Prior Publication Data
US 2018/0033225 A1 Feb. 1, 2018

Related U.S. Application Data

(63) Continuation of application No. 15/006,066, filed on Jan. 25, 2016, now Pat. No. 9,786,104.

(51) Int. Cl.
*G07C 5/08* (2006.01)
*G01C 21/26* (2006.01)
(Continued)

(52) U.S. Cl.
CPC ........... *G07C 5/0808* (2013.01); *B60W 40/04* (2013.01); *B60W 40/09* (2013.01); *G01C 21/26* (2013.01);
(Continued)

(58) Field of Classification Search
CPC .... G07C 5/0808; G07C 5/008; G07C 5/0825; G07C 5/0816; G07C 5/0841; B60W 40/09; B60W 40/04; B60W 2550/12; B60W 2540/14; B60W 2520/125; B60W 2520/105; B60W 2520/10; B60W 2550/14; B60W 2510/182; B60W 2510/0666; B60W 2510/0604; B60W 2420/403;
(Continued)

(56) References Cited

U.S. PATENT DOCUMENTS

| | | | |
|---|---|---|---|
| 5,680,123 | A | 10/1997 | Lee |
| 5,978,017 | A | 11/1999 | Tino |
| 6,812,831 | B2 | 11/2004 | Ikeda |
| 7,536,457 | B2 | 5/2009 | Miller |

(Continued)

OTHER PUBLICATIONS

International Search Report and Written Opinion for PCTIB1750397, dated May 5, 2017, 10 pages.

*Primary Examiner* — Michael V Kerrigan
(74) *Attorney, Agent, or Firm* — Epslin & Associates, PC

(57) ABSTRACT

This disclosure relates to a system and method for detecting vehicle events. Some or all of the system may be installed in a vehicle, operate at the vehicle, and/or be otherwise coupled with a vehicle. The system includes one or more sensors configured to generate output signals conveying information related to the vehicle. The system receives contextual information from a source external to the vehicle. The system detects a vehicle event based on the information conveyed by the output signals from the sensors and the received contextual information.

12 Claims, 5 Drawing Sheets

(51) Int. Cl.
*B60W 40/04* (2006.01)
*B60W 40/09* (2012.01)
*G07C 5/00* (2006.01)

(52) U.S. Cl.
CPC ..... *G07C 5/0816* (2013.01); *B60W 2420/403* (2013.01); *B60W 2510/0604* (2013.01); *B60W 2510/0666* (2013.01); *B60W 2510/182* (2013.01); *B60W 2520/10* (2013.01); *B60W 2520/105* (2013.01); *B60W 2520/125* (2013.01); *B60W 2530/14* (2013.01); *B60W 2540/18* (2013.01); *B60W 2552/00* (2020.02); *B60W 2554/00* (2020.02); *B60W 2555/20* (2020.02); *G07C 5/008* (2013.01); *G07C 5/0841* (2013.01)

(58) Field of Classification Search
CPC ......... B60W 2550/10; B60W 2530/14; B60W 2540/18; B60W 30/00; B60W 2555/20; B60W 2554/00; B60W 2552/00; G01C 21/26; G01C 22/00
See application file for complete search history.

(56) References Cited

U.S. PATENT DOCUMENTS

| | | | |
|---|---|---|---|
| 8,996,234 | B1 | 3/2015 | Tamari |
| 9,395,702 | B2 | 7/2016 | Staudenmaier |
| 2001/0018628 | A1* | 8/2001 | Jenkins ............... G08G 1/127 |
| | | | 701/33.4 |
| 2003/0055557 | A1 | 3/2003 | Dutta |
| 2004/0243308 | A1 | 12/2004 | Irish |
| 2005/0065682 | A1 | 3/2005 | Kapadia |
| 2005/0185052 | A1 | 8/2005 | Raisinghani |
| 2006/0092043 | A1 | 5/2006 | Lagassey |
| 2006/0099959 | A1 | 5/2006 | Staton |
| 2009/0299622 | A1 | 12/2009 | Denaro |
| 2010/0045451 | A1 | 2/2010 | Periwal |
| 2010/0057342 | A1 | 3/2010 | Muramatsu |
| 2012/0089423 | A1 | 4/2012 | Tamir |
| 2012/0176234 | A1 | 7/2012 | Taneyhill |
| 2015/0341620 | A1 | 11/2015 | Han |
| 2015/0375756 | A1* | 12/2015 | Do ..................... B60W 50/14 |
| | | | 701/1 |
| 2016/0001781 | A1 | 1/2016 | Fung |
| 2017/0200061 | A1* | 7/2017 | Julian ............... G06K 9/00791 |

* cited by examiner

SYSTEMS AND METHOD TO TRIGGER VEHICLE EVENTS BASED ON CONTEXTUAL INFORMATION

FIELD

The systems and methods disclosed herein are related to detection of vehicle events, and, in particular, detection of vehicle events that are based, at least in part, on current environmental conditions near and/or around a vehicle.

BACKGROUND

Systems configured to record, store, and transmit video, audio, and/or sensor data associated with a vehicle, e.g. in response to an accident involving the vehicle are known. Typically, such systems detect an accident based on data from a single sensor such as an accelerometer mounted on the vehicle. Video from the accident may usually be analyzed by a user at a later time after the accident. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to detect vehicle events. The system may be coupled and/or otherwise related to a vehicle. Some or all of the system may be installed in the vehicle and/or be otherwise coupled with the vehicle. In some implementations, the system may include one or more sensors, one or more servers, one or more physical processors, electronic storage, one or more external providers, and/or other components. The one or more sensors may be configured to generate output signals conveying information related to the vehicle and/or one or more current operating conditions of the vehicle. In some implementations, the system may detect vehicle events based on a comparison of the information conveyed by the output signals from the sensors to predetermined (variable and/or fixed) values, threshold, functions, and/or other information. Advantageously, the system may identify vehicle events in real-time or near real-time during operation of the vehicle. As used herein, the term "processor" is used interchangeably with the term "physical processor."

The one or more sensors may be configured to generate output signals conveying information related to the operation and/or one or more operating conditions of the vehicle. Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle.

The one or more servers may include one or more processors configured to execute one or more computer program components. The computer program components may include one or more of an operation component, a context component, a detection component, a record component, a notification component, a location component, and/or other components.

The operation component may be configured to determine current operating conditions and/or vehicle parameters of vehicles. The operation component may determine current operating conditions based on the information conveyed by the output signals from the sensors and/or other information. The one or more current operating conditions may be related to the vehicle, the operation of the vehicle, physical characteristics of the vehicle, and/or other information. In some implementations, the operation component may be configured to determine one or more of the current operating conditions one or more times in an ongoing manner during operation of the vehicle.

The context component may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, one or more environmental conditions may be received from one or more sources external to the vehicle. For example, a source external to the vehicle may include a remote server and/or an external provider.

The detection component may be configured to detect vehicle events. Detection of vehicle events may be based on one or more current operating conditions of the vehicle. In some implementations, detection may be further based on one or more types of contextual information. In some implementations, detection may be accomplished and/or performed at the vehicle, e.g. by a physical processor that is carried by the vehicle.

The record component may be configured to record, store, and/or transmit information, including but not limited to information related to vehicle events. In some implementations, information related to vehicle events may be used to create vehicle event records. Vehicle event records may include video information, audio information, data from an ECM system, metadata, information based on sensor-generated output, and/or other information.

Vehicle event records may be stored locally in a vehicle and/or transmitted from a vehicle to a system, server, and/or service that is external to the vehicle, including but not limited to a remote server and/or an external provider. In some implementations, a system, server, and/or service that is external to the vehicle may query and/or request information from a particular vehicle. The record component may be configured to respond to a query or request by transmitting information as queried and/or requested. In some implementations, the record component may be configured to facilitate communication of information between vehicles, remote servers, external providers, and/or other systems, servers, and/or services external to vehicles. Communication may be in real-time or near real-time. Communication may be wireless.

The notification component may be configured to generate and/or determine notifications related to vehicle events. In some implementations, notifications may be intended for drivers of vehicles. For example, the notification component may be configured to provide notifications to drivers, including but not limited to warnings or requests (for example to reduce speed). In some implementations, notifications may be transmitted from a vehicle to a system, server, and/or service that is external to the vehicle, including but not limited to a remote server and/or an external provider.

The location component may be configured to obtain and/or determine information related to the locations of vehicles and/or other locations (which may be referred to as location information). In some implementations, the location component may be configured to receive information related to the current location of a vehicle. By way of non-limiting example, location information may include global positioning system (GPS) information.

As used herein, any association (or relation, or reflection, or indication, or correspondency) involving vehicles, sensors, vehicle events, operating conditions, parameters, thresholds, functions, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
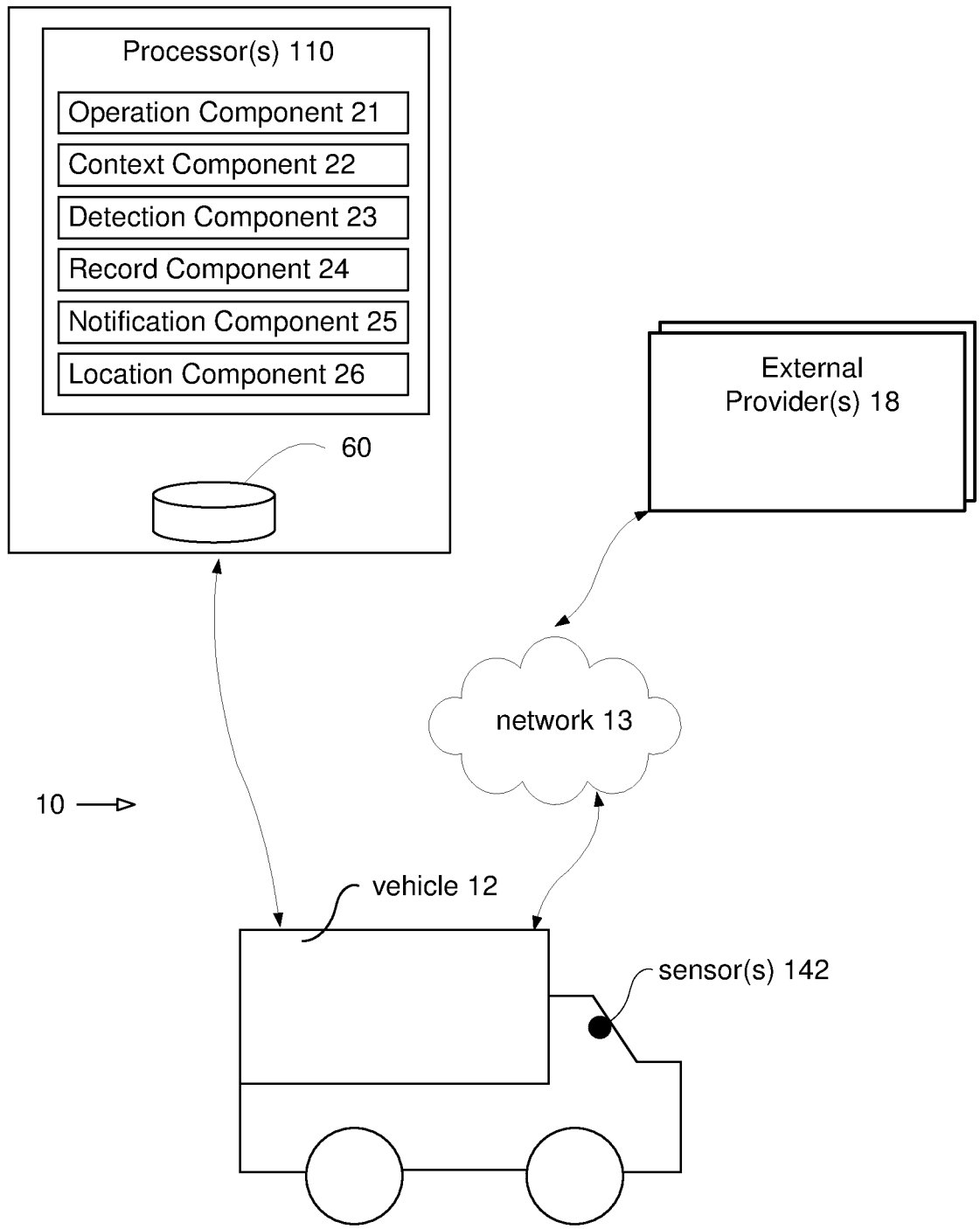
FIG. 1 illustrates a system configured to detect vehicle events, in accordance with one or more embodiments.

FIG. 1 illustrates a system 10 configured to detect vehicle events of a vehicle 12. Some or all of system 10 may be installed in vehicle 12, carried by vehicle 12, and/or be otherwise coupled with and/or related to vehicle 12. In some implementations, system 10 may include one or more sensors 142, one or more servers 11, one or more physical processors 110, electronic storage 60, a network 13, one or more external providers 18, and/or other components. One or more sensors 142 may be configured to generate output signals. The output signals may convey information related to vehicle 12 and/or one or more current operating conditions of vehicle 12. In some implementations, one or more sensors 142 may be carried by vehicle 12.

Information related to current operating conditions of the vehicle may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 142 may be a vehicle system sensor included in an ECM system of vehicle 12.

In some implementations, one or more sensors 142 may include a video camera, an image sensor, and/or a microphone. Based on an analysis of images and/or sounds captured, system 10 may determine, using algorithms, that vehicle 12 is moving forward, is in reverse, has maneuvered outside of its lane of traffic, is making a turn, and/or other maneuvers. For example, by way of non-limiting example, driving maneuvers may include swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change, speeding, running a red light, running a stop sign, and/or other driving maneuvers.

In some implementations, information related to current operating conditions of vehicle 12 may include information related to the environment in and/or around vehicle 12. The vehicle environment may include spaces in and around an interior and an exterior of vehicle 12. The information may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying information may be generated via non-standard aftermarket sensors installed in vehicle 12. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, one or more sensors 142 may include multiple cameras positioned around vehicle 12 and synchronized together to provide a 360 degree view of the inside of vehicle 12 and/or a 360 degree view of the outside of vehicle 12.

Although sensors 142 are depicted in FIG. 1 as a single element, this is not intended to be limiting. Sensors 142 may include one or more sensors located adjacent to and/or in communication with the various mechanical systems of vehicle 12, in one or more positions (e.g., at or near the front of vehicle 12, at or near the back of vehicle 12, etc.) to accurately acquire information representing the vehicle environment (e.g. visual information, spatial information, orientation information), and/or in other locations. For example, in some implementations, system 10 may be configured such that a first sensor is located near or in communication with a rotating tire of vehicle 12, and a second sensor located on top of vehicle 12 is in communication with a geolocation satellite. In some implementations, sensors 142 may be configured to generate output signals continuously during operation of vehicle 12.

As shown in FIG. 1, server 11 may include one or more processors 110 configured to execute one or more computer program components. The computer program components may comprise one or more of an operation component 21, a context component 22, a detection component 23, a record component 24, a notification component 25, a location component 26, and/or other components.

Operation component 21 may be configured to determine current operating conditions and/or vehicle parameters of vehicles, e.g. vehicle 12. Operation component 21 may determine current operating conditions based on the information conveyed by the output signals from sensors 142 and/or other information. The one or more current operating conditions may be related to vehicle 12, the operation of vehicle 12, physical characteristics of vehicle 12, and/or other information. In some implementations, operation component 21 may be configured to determine one or more of the current operating conditions one or more times in an ongoing manner during operation of vehicle 12.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, and/or other parameters.

The physical characteristics of vehicle 12 may be physical features of vehicle 12 set during manufacture of vehicle 12, during loading of vehicle 12, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 12 (e.g., food items, livestock, construction materials, hazardous materials, an oversized load, a liquid), vehicle trailer type, trailer length, trailer weight, trailer height, a number of axles, and/or other physical features. In some implementations, one or more vehicle parameters may be based on (and/or interpreted differently in the presence of) systems that a vehicle is equipped with, including but not limited to a stability system, a forward collision warning system, automatic brake system, and/or other systems that a vehicle may be equipped with. For example, the presence or absence of a particular system, e.g. a forward collision warning system, may modify the sensitivity of the process and/or mechanism by which vehicle events are detected.

In some implementations, operation component 21 may be configured to determine one or more vehicle parameters based on the output signals from at least two different sensors. For example, operation component 21 may determine one or more of the vehicle parameters based on output signals from a sensor 142 related to the ECM system and an external aftermarket added sensor 142. In some implementations, a determination of one or more of the vehicle parameters based on output signals from at least two different sensors 142 may be more accurate and/or precise than a determination based on the output signals from only one sensor 142. For example, on an icy surface, output signals from an accelerometer may not convey that a driver of vehicle 12 is applying the brakes of vehicle 12. However, a sensor in communication with the braking system of vehicle 12 would convey that the driver is applying the brakes. System 10 may determine a value of a braking parameter based on the braking sensor information even though the output signals from the accelerometer may not convey that the driver is applying the brakes.

Operation component 21 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data, engine load, and/or other information to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of vehicle 12. In some implementations, one or more of the vehicle parameters may be determined at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, system 10 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 10, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data in an event player apparatus.

In some implementations, system 10 may be configured to detect specific driving maneuvers based on one or more of a vehicle speed, an engine load, a throttle level, vehicle direction, a gravitational force, and/or other parameters being sustained at or above threshold levels for pre-determined amounts of time. In some implementations, an acceleration and/or force threshold may be scaled based on a length of time that an acceleration and/or force are maintained, and/or the particular speed the vehicle is travelling. System 10 may be configured such that force maintained over a period of time at a particular vehicle speed may decrease a threshold force the longer that the force is maintained. System 10 may be configured such that, combined with engine load data, throttle data may be used to determine a risky event, a fuel wasting event, and/or other events.

Context component 22 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, one or more environmental conditions may be received from one or more sources external to vehicle 12. For example, a source external to vehicle 12 may include a remote server and/or an external provider 18. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking and steering. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, contextual information may be received by system 10 through network 13, e.g. the internet. Network 13 may include private networks, public networks, and/or combinations thereof. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

Detection component 23 may be configured to detect vehicle events. Detection of vehicle events may be based on one or more current operating conditions of vehicle 12. In some implementations, detection may be further based on one or more types of contextual information. In some implementations, detection may be accomplished and/or performed at vehicle 12, e.g. by processor 110 that is carried by vehicle 12. Vehicle events may include speeding, unsafe driving speed, collisions, near-collisions, and/or other events. In some implementations, vehicle events may include the distance between two vehicles being dangerously small, which may for example indicate an increased likelihood of a collision. In some implementations, vehicle events may include one or more driving maneuvers.

In some implementations, a value of a current operating condition that effectuates detection of a vehicle event may vary as a function of the contextual information. For example, a speed of 50 mph (in a particular geographical location) may not effectuate detection of a vehicle event when the road surface is dry and/or when traffic is light, but the same speed in the same geographical location may effectuate detection of a vehicle event responsive to contextual information indicating that the road surface is wet and/or icy (and/or may be wet and/or icy), or responsive to contextual information that traffic is heavy (and/or may be heavy). In this example, the contextual information may have an effect of the detection of vehicle events. In some implementations, contextual information may modify the sensitivity of the process and/or mechanism by which vehicle events are detected.

For example, a particular vehicle 12 operates at a particular operating condition (as determined based on output signals generated by a particular sensor 142). In light of a particular current environmental condition at a first moment (e.g. sunny weather and/or light traffic), the particular operating condition may provide an insufficient impetus to determine and/or detect a particular vehicle event (e.g. "unsafe driving speed"). Subsequently, at a second moment after the first moment, a different environmental condition (e.g. rain, snow, and/or heavy traffic) becomes operative (e.g., the different environmental condition may be received at particular vehicle 12 as contextual information). In light of the different environmental condition, the combination of the different environmental condition and the particular operating condition may provide a sufficient impetus to determine and/or detect a particular vehicle event.

Figure 3:
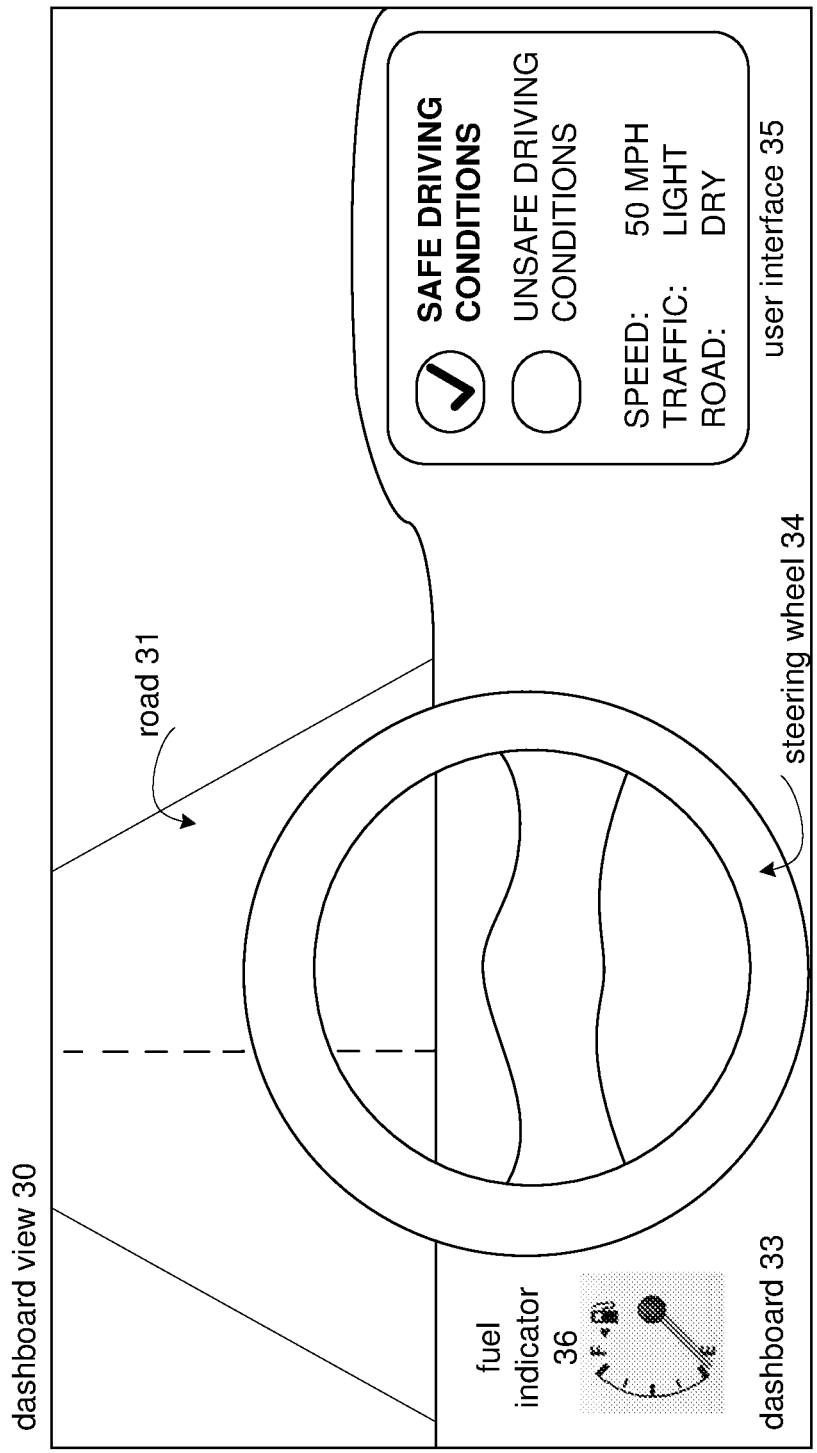
FIGS. 3-4-5 illustrate exemplary dashboard views for a vehicle that includes a system configured to detect vehicle events in accordance with one or more embodiments.

By way of non-limiting example, FIG. 3 illustrates a dashboard view 30 for a vehicle that includes a system configured to detect vehicle events, similar to system 10 (not shown in FIG. 3). Dashboard view 30 illustrates the view of a driver of a vehicle, including a dashboard 33, a fuel indicator 36, a steering wheel 34, a road 31, and a user interface 35. User interface 35 may be configured to indicate the presence or absence of vehicle events, including but not limited to a vehicle event referred to as "unsafe driving conditions." As illustrated in dashboard view 30, the absence of unsafe driving conditions may be indicated by an indicator labeled "safe driving conditions." User interface 35 may indicate one or more current operating conditions (e.g. speed) as well as one or more current environmental conditions (e.g. light or heavy traffic, dry or wet road surface, etc.). The one or more current environmental conditions may be related to and/or based on contextual information received, e.g., from an external source of contextual information.

Figure 4:
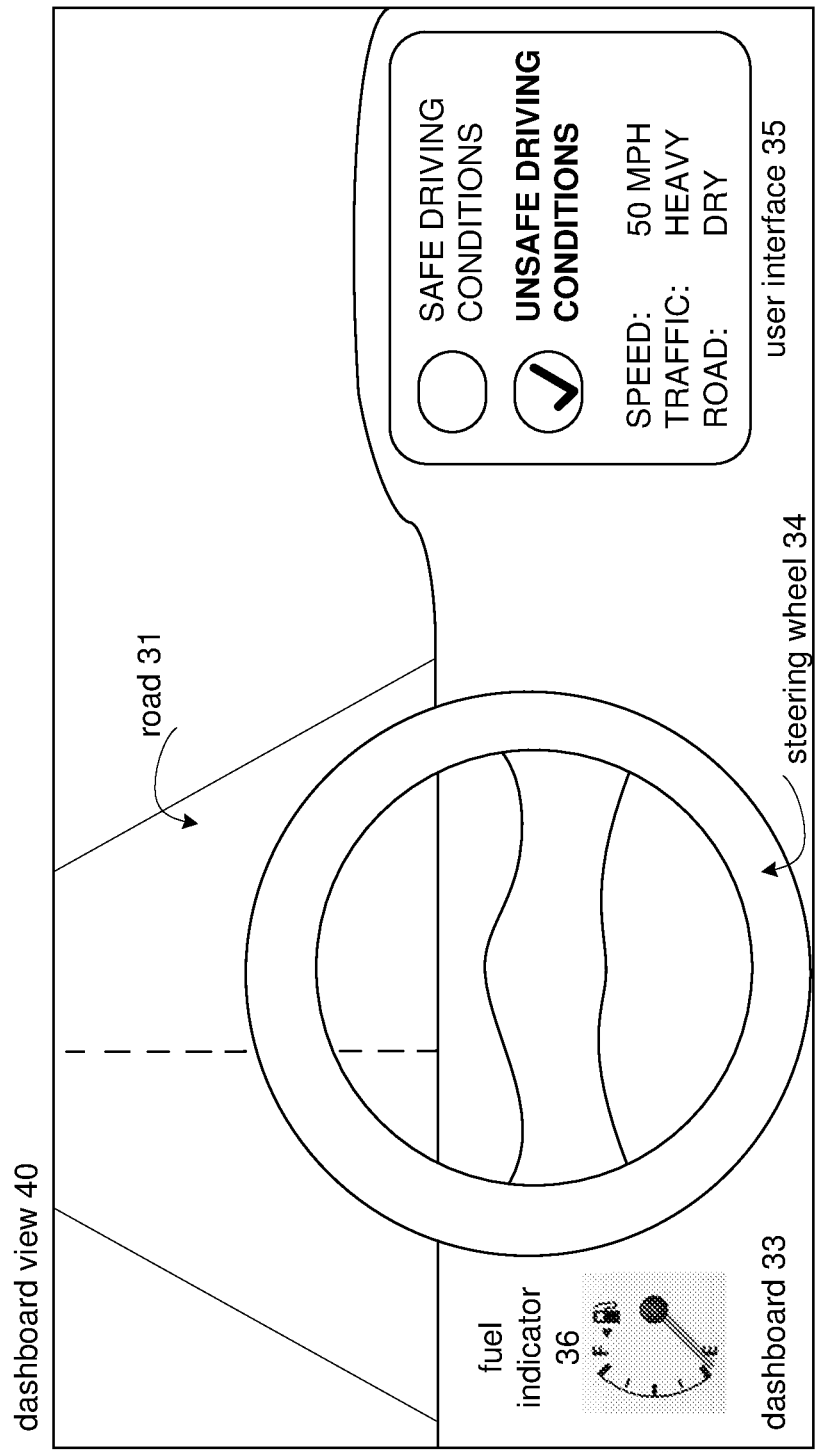

By way of non-limiting example, FIG. 4 illustrates a dashboard view 40 for a vehicle that includes a system configured to detect vehicle events, similar to system 10 (not shown in FIG. 4). Dashboard view 40 illustrates the view of a driver of a vehicle, including a dashboard 33, a fuel indicator 36, a steering wheel 34, a road 31, and a user interface 35, similar to dashboard view 30 in FIG. 3. Referring to FIG. 4, user interface 35 may be configured to indicate the presence or absence of vehicle events, including but not limited to a vehicle event referred to as "unsafe driving conditions." As illustrated in dashboard view 40, the presence of unsafe driving conditions may be indicated by an indicator labeled "unsafe driving conditions." User interface 35 may indicate one or more current operating conditions (e.g. speed) as well as one or more current environmental conditions (e.g. light or heavy traffic, dry or wet road surface, etc.). As illustrated in user interface 35, current traffic conditions are characterized as heavy (this may for example be based on average driving speed on a particular section of the road, and/or on other traffic-related information). The one or more current environmental conditions may be related to and/or based on contextual information received, e.g., from an external source of contextual information. The combination of one or more current operating conditions and one or more current environmental conditions may provide a sufficient impetus to determine and/or detect a particular vehicle event (e.g. "unsafe driving speed" or "unsafe driving conditions"). This particular vehicle event may be notified to the driver, e.g. through user interface 35 as shown in FIG. 4.

Figure 5:
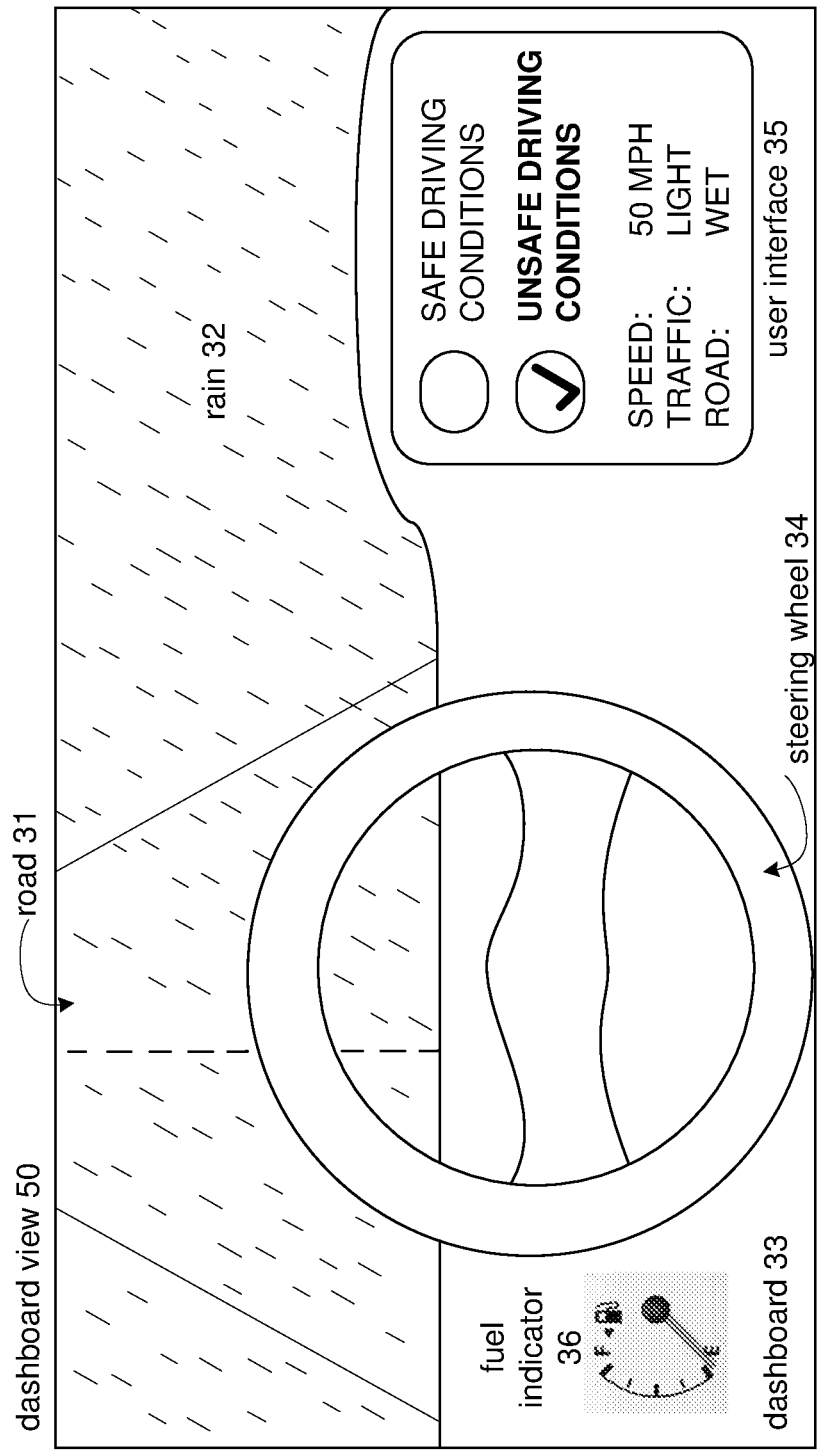

By way of non-limiting example, FIG. 5 illustrates a dashboard view 50 for a vehicle that includes a system configured to detect vehicle events, similar to system 10 (not shown in FIG. 5). Dashboard view 50 illustrates the view of a driver of a vehicle, including a dashboard 33, a fuel indicator 36, a steering wheel 34, a road 31, and a user interface 35, similar to dashboard view 30 in FIG. 3. Referring to FIG. 5, user interface 35 may be configured to indicate the presence or absence of vehicle events, including but not limited to a vehicle event referred to as "unsafe driving conditions." As illustrated in dashboard view 50, the presence of unsafe driving conditions may be indicated by an indicator labeled "unsafe driving conditions." User interface 35 may indicate one or more current operating conditions (e.g. speed) as well as one or more current environmental conditions (e.g. light or heavy traffic, dry or wet road surface, etc.). As illustrated in user interface 35, current weather and/or road-surface conditions are characterized as wet (this may for example be based on weather information for an area that includes a particular section of the road, and/or on other weather-related information). The one or more current environmental conditions may be related to and/or based on contextual information received, e.g., from an external source of contextual information. The combination of one or more current operating conditions and one or more current environmental conditions may provide a sufficient impetus to determine and/or detect a particular vehicle event (e.g. "unsafe driving speed" or "unsafe driving conditions"). This particular vehicle event may be notified to the driver, e.g. through user interface 35 as shown in FIG. 5.

In some implementations, detection of vehicle events may be based on one or more comparisons of the values of current operating conditions with threshold values. In some implementations, a particular threshold value may vary as a function of contextual information.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at vehicle 12 speeds less than about 10 kph. The −0.3 g and/or +0.3 g criteria may be scaled as vehicle 12 increases in speed. In some implementations, the −0.3 g and/or +0.3 g criteria may be scaled (e.g., reduced) by about 0.0045 g per kph of speed over 10 kph. To prevent too much sensitivity, system 10 may limit the lateral force criteria to about +/−0.12 g, regardless of the speed of vehicle 12, for example. In some implementations, the criterion for the given period of time between swerves may be about 3 seconds.

Record component 24 may be configured to record, store, and/or transmit information, including but not limited to information related to vehicle events. In some implementations, information related to vehicle events may be used to create vehicle event records. Vehicle event records may include video information, audio information, data from an ECM system, metadata, information based on sensor-generated output, and/or other information.

Vehicle event records may be stored locally in vehicle 12 and/or transmitted from vehicle 12 to system 10, server 11, and/or service that is external to the vehicle, including but not limited to a remote server and/or external provider 18. In some implementations, system 10, server 11, and/or service that is external to vehicle 12 may query and/or request information from a particular vehicle 12. Record component 24 may be configured to respond to a query or request by transmitting information as queried and/or requested. In some implementations, record component 24 may be configured to facilitate communication of information between vehicles, remote servers, external providers, and/or other systems, servers, and/or services external to vehicles. Communication may be in real-time or near real-time. Communication may be wireless.

Notification component 25 may be configured to generate and/or determine notifications related to vehicle events. In some implementations, notifications may be intended for drivers of vehicles. For example, notification component 25 may be configured to provide notifications to drivers, including but not limited to warnings or requests (for example to reduce speed). In some implementations, notifications may be transmitted from vehicle 12 to system 10, server 11, and/or service that is external to vehicle 12, including but not limited to a remote server and/or external provider 18. For example, a notification that a collision has occurred may be transmitted to a remote server and/or external provider 18. In some implementations, notifications may be stored locally, in electronic storage of a particular vehicle 12. Stored notifications may be retrieved later, e.g. after the particular vehicle 12 has returned to fleet headquarters, or subsequent to the particular vehicle 12 entering a particular geographical area (e.g. within range of wireless communication with a particular external provider 18).

Location component 26 may be configured to obtain and/or determine information related to the locations of vehicles and/or other locations (which may be referred to as location information). In some implementations, location component 26 may be configured to receive information related to the current location of vehicle 12. By way of non-limiting example, location information may include global positioning system (GPS) information. Operation by other components of system 10 may be based, at least in part, on information obtained and/or determined by location component 26. For example, detection of vehicle events may be affected based on proximity and/or orientation to objects near vehicle 12, geo-fence around vehicle 12, and/or other conditions related to vehicle 12.

In some implementations, system 10 may include a user interface configured to provide an interface between system 10 and users through which the users may provide information to and receive information from system 10. This enables information to be communicated between a user and one or more of processor 110, sensors 142, vehicle 12, and/or other components of system 10. As an example, a dangerous driving maneuver and/or vehicle event may be displayed to the driver of vehicle 12 via the user interface, e.g. as a notification.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices.

It is to be understood that other communication techniques, either hard-wired or wireless, are also contemplated by the present disclosure as a user interface. Information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 include, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as a user interface.

Electronic storage 60 may comprise electronic storage media that electronically stores information. The electronic storage media of electronic storage 60 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 60 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 60 may store software algorithms, recorded video event data, information determined by processor 110, information received via a user interface, and/or other information that enables system 10 to function properly. Electronic storage 60 may be (in whole or in part) a separate component within system 10, or electronic storage 60 may be provided (in whole or in part) integrally with one or more other components of system 10.

In some implementations, a remote server may include communication lines, or ports to enable the exchange of information with a network, processor 110 of system 10, and/or other computing platforms. The remote server may include a plurality of processors, electronic storage, hardware, software, and/or firmware components operating together to provide the functionality attributed herein to a remote device. For example, the server may be implemented by a cloud of computing platforms operating together as a system server.

As described above, processor 110 may be configured to provide information processing capabilities in system 10. As such, processor 110 may comprise one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may comprise a plurality of processing units. These processing units may be physically located within the same device (e.g., a vehicle event recorder), or processor 110 may represent processing functionality of a plurality of devices operating in coordination.

Processor 110 may be configured to execute components 21-26 by software; hardware; firmware; some combination of software, hardware, and/or firmware; and/or other mechanisms for configuring processing capabilities on processor 110. It should be appreciated that although components 21-26 are illustrated in FIG. 1 as being co-located within a single processing unit, in implementations in which processor 110 comprises multiple processing units, one or more of components 21-26 may be located remotely from the other components. The description of the functionality provided by the different components 21-26 described herein is for illustrative purposes, and is not intended to be limiting, as any of components 21-26 may provide more or less functionality than is described. For example, one or more of components 21-26 may be eliminated, and some or all of its functionality may be provided by other components 21-26. As another example, processor 110 may be configured to execute one or more additional components that may perform some or all of the functionality attributed below to one of components 21-26.

Figure 2:
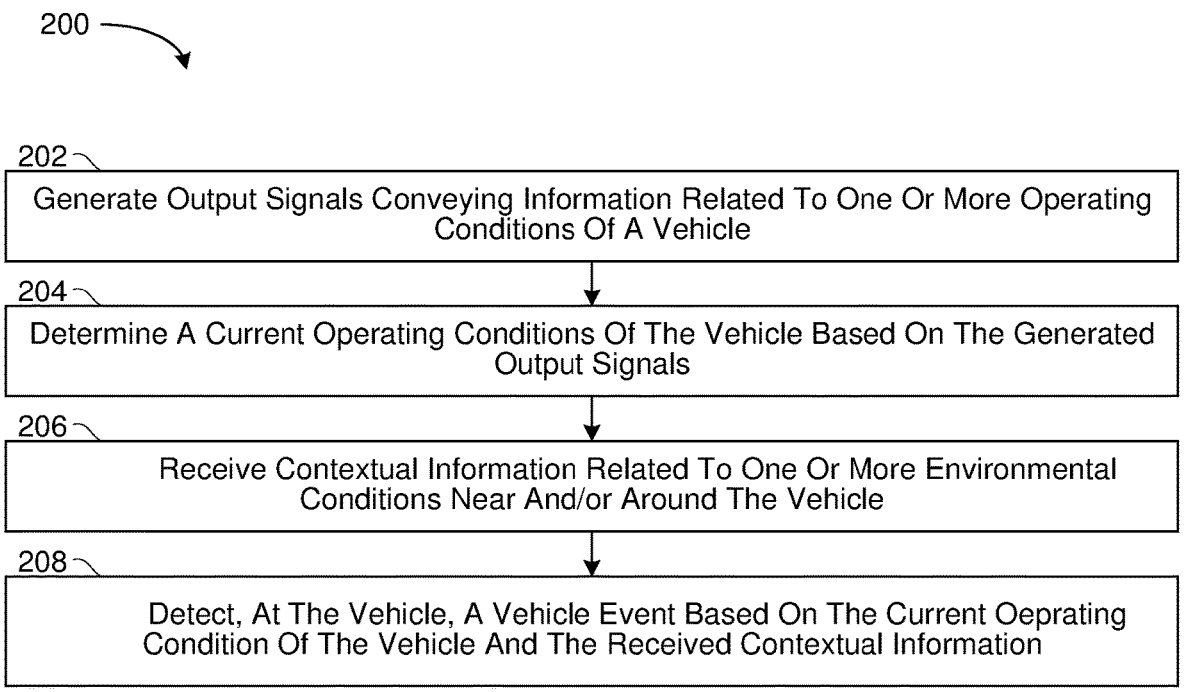
FIG. 2 illustrates a method to detect vehicle events, in accordance with one or more embodiments.

FIG. 2 illustrates a method 200 to detect vehicle events. The operations of method 200 presented below are intended to be illustrative. In some implementations, method 200 may be accomplished with one or more additional operations not described, and/or without one or more of the operations discussed. Additionally, the order in which the operations of method 200 are illustrated (in FIG. 2) and described below is not intended to be limiting. In some implementations, two or more of the operations may occur substantially simultaneously.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at an operation 202, output signals are generated conveying information related to one or more current operating conditions of the vehicle. The one or more sensors are carried by the vehicle. In some embodiments, operation 202 is performed by a sensor the same as or similar to sensor 142 (shown in FIG. 1 and described herein).

At an operation 204, a current operating condition of the vehicle is determined based on the generated output signals. In some embodiments, operation 204 is performed by an operation component the same as or similar to operation component 21 (shown in FIG. 1 and described herein).

At an operation 206, contextual information is received related to one or more current environmental conditions near and/or around the vehicle. In some embodiments, operation 206 is performed by a context component the same as or similar to context component 22 (shown in FIG. 1 and described herein).

At an operation 208, at the vehicle, a vehicle event is detected based on the current operating condition of the vehicle and further based on the received contextual information. A value of the current operating condition of the vehicle that effectuates detection of the vehicle event varies as a function of the received contextual information. In some embodiments, operation 208 is performed by a detection component the same as or similar to detection component 23 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to detect vehicle events, the system configured to couple with a vehicle, wherein the vehicle is configured to carry one or more sensors that generate output signals conveying information related to one or more operating parameters of the vehicle, the system comprising:
one or more processors configured to:
determine a speed parameter of the vehicle based on the generated output signals, wherein the speed parameter represents current vehicle speed of the vehicle;
receive contextual information related to two or more current environmental conditions, wherein the two or more current environmental conditions include a traffic condition that indicates average driving speed of current traffic within a first predetermined distance of the vehicle, and a visibility condition related to visibility within a second predetermined distance of the vehicle;
determine a speed limit at which the speed parameter of the vehicle effectuates detection of vehicle events related to unsafe vehicle speed, wherein the speed limit varies based on the traffic condition;
determine a threshold value for the traffic condition such that, responsive to the traffic condition breaching the threshold value, the current traffic within the first predetermined distance of the vehicle is characterized as heavy, wherein the threshold value varies based on the visibility condition;
at the vehicle, detect a vehicle event based on a combination of:
the speed parameter of the vehicle breaching the speed limit, and
the current traffic within the first predetermined distance of the vehicle being characterized as heavy; and
create a vehicle event record based on the detected vehicle event.

2. The system of claim 1, further comprising electronic storage configured to store information, wherein the one or more processors are further configured to:
store the vehicle event record in the electronic storage; and
effectuate presentation to a user of the system, via a user interface, of a notification based on the vehicle event record.

3. The system of claim 1, wherein at least some of the contextual information is received from one or more sources external to the vehicle.

4. The system of claim 1, wherein the vehicle event includes a particular driving maneuver.

5. The system of claim 1, further including the one or more sensors, wherein the one or more sensors include a video camera, and wherein the one or more sensors are configured such that the information related to the one or more operating parameters of the vehicle includes video information.

6. The system of claim 1, wherein the one or more processors are further configured to determine and/or obtain geographical information of the vehicle, and wherein detection of the vehicle event is further based on the geographical information of the vehicle.

7. A system configured to detect vehicle events, the system configured to couple with a vehicle, the vehicle being configured to carry one or more sensors that generate output signals conveying information related to one or more operating conditions of the vehicle, the system comprising:
one or more processors configured to:
determine a first speed parameter and a second speed parameter of the vehicle based on the generated output signals, wherein the first speed parameter corresponds to a first moment in time, wherein the second speed parameter corresponds to a second moment in time, and wherein the second moment in time is subsequent to the first moment in time;
at the vehicle, analyze the first speed parameter and determine that no vehicle event has occurred that needs to be reported;
receive contextual information related to two or more current environmental conditions, wherein the two or more current environmental conditions include a traffic condition that indicates average driving speed of current traffic within a first predetermined distance of the vehicle, and a visibility condition related to visibility within a second predetermined distance of the vehicle;
determine a speed limit at which the second speed parameter of the vehicle effectuates detection of vehicle events related to unsafe vehicle speed, wherein the speed limit varies based on the traffic condition;
determine a threshold value for the traffic condition such that, responsive to the traffic condition breaching the threshold value, the current traffic within the first predetermined distance of the vehicle is characterized as heavy, wherein the threshold value varies based on the visibility condition;
at the vehicle, detect a vehicle event based on a combination of:
the second speed parameter of the vehicle breaching the speed limit, and
the current traffic within the first predetermined distance of the vehicle being characterized as heavy;
create a vehicle event record based on the detected vehicle event;
store the vehicle event record in an electronic storage; and
effectuate presentation to a user of the system, via a user interface, of a notification based on the vehicle event record.

8. A method to detect vehicle events for a vehicle, the vehicle being configured to carry one or more sensors that generate output signals conveying information related to operating parameters of the vehicle, the method being implemented in a computer system that includes the one or more sensors and one or more physical processors, the method comprising:
receiving contextual information related to two or more current environmental conditions, wherein the two or more current environmental conditions include a traffic condition that indicates average driving speed of current traffic within a first predetermined distance of the vehicle, and a visibility condition related to visibility within a second predetermined distance of the vehicle;
determining a speed limit at which a speed parameter of the vehicle effectuates detection of vehicle events related to unsafe vehicle speed, wherein the speed parameter represents current vehicle speed of the vehicle, wherein the speed limit varies based on the traffic condition;

determining a threshold value for the traffic condition such that, responsive to the traffic condition breaching the threshold value, the current traffic within the first predetermined distance of the vehicle is characterized as heavy, wherein the threshold value varies based on the visibility condition;

detecting, at the vehicle, a vehicle event based on a combination of:
- the speed parameter breaching the speed limit, and
- the current traffic within the first predetermined distance of the vehicle being characterized as heavy; and creating a vehicle event record based on the detected vehicle event.

9. The method of claim 8, further comprising:
storing the vehicle event record in an electronic storage; and
effectuating presentation to a user of the system, via a user interface, of a notification based on the vehicle event record.

10. The method of claim 8, wherein at least some of the contextual information is received from one or more sources external to the vehicle.

11. The method of claim 8, wherein the one or more sensors include a video camera, and wherein the information related to the operating parameters of the vehicle includes video information.

12. The method of claim 8, further comprising determining and/or obtaining geographical information of the vehicle, and wherein detecting the vehicle event is further based on the geographical information of the vehicle.

* * * * *